United States Patent [19]

McGinniss

[11] 3,857,769

[45] Dec. 31, 1974

[54] PHOTOPOLYMERIZABLE COATING COMPOSITIONS AND PROCESS FOR MAKING SAME WHICH CONTAINS A THIOXANTHONE AND/AN ACTIVATED HALOGENATED AZINE COMPOUND AS SENSITIZERS

[75] Inventor: Vincent Daniel McGinniss, Middleburg Heights, Ohio

[73] Assignee: SCM Corporation, Cleveland, Ohio

[22] Filed: Nov. 8, 1973

[21] Appl. No.: 413,830

[52] U.S. Cl. ....... 204/159.24, 96/115 P, 117/93.31, 117/132 B, 117/161 UT, 117/161 UZ, 117/161 UC, 204/159.23, 252/426, 260/2.5 B, 260/42.21, 260/42.52, 260/77.5 CR, 260/80.75, 260/80.81, 260/86.1 E, 260/89.5 A

[51] Int. Cl. .......................... C08d 1/00, C08f 1/16

[58] Field of Search ................. 204/159.23, 159.24; 90/115 P

[56] References Cited

UNITED STATES PATENTS

| | | | |
|---|---|---|---|
| 3,702,812 | 11/1972 | McGinniss | 204/159.24 |
| 3,717,558 | 2/1973 | McGinniss | 204/159.24 |
| 3,787,212 | 1/1974 | Heimsch et al. | 204/159.24 |

*Primary Examiner*—Murray Tillman
*Assistant Examiner*—Richard B. Turer
*Attorney, Agent, or Firm*—S. I. Khayat; M. H. Douthitt

[57] ABSTRACT

Ultraviolet polymerization of photopolymerizable binders or vehicles is improved by incorporating thereinto a sensitizer composition comprising a thioxanthone and an activated halogenated azine compound.

6 Claims, No Drawings

PHOTOPOLYMERIZABLE COATING COMPOSITIONS AND PROCESS FOR MAKING SAME WHICH CONTAINS A THIOXANTHONE AND AN ACTIVATED HALOGENATED AZINE COMPOUND AS SENSITIZERS

CROSS REFERENCE TO RELATED APPLICATIONS

The present patent application is related to my copending patent applications Ser. Nos. 323,031; 323,087 and 323,088 all of which bear the same filing date of Jan. 12, 1973, application Ser. No. 357,479 filed May 4, 1973. All of these applications are incorporated herein by reference.

BACKGROUND OF THE INVENTION

A. Field of the Invention

The present invention is concerned with the ultraviolet polymerization of pigmented photopolymerizable binders and vehicles, which polymerization is enhanced considerably by the incorporation of certain sensitizers into said binders.

B. Description of the Prior Art

It is known that the photopolymerization of ethylenically unsaturated monomers can be initiated by exposure to various sources of radiation such as ultraviolet radiation. For example, methyl acrylate on long standing in sunlight will generally transform into a transparent mass. Use of sunlight or sources of comparable energy to photopolymerize monomers or combination of monomers, oligomers, etc., is not practical because of very slow rates of polymerization. Improved rates can be induced by applying thermal energy, particularly in combination with free radical promoting catalysts. Thermal energy or heat for this purpose has been supplied by conventional convection ovens and radiant heat from sources such as infrared lamps to effect the desired rate of polymerization. However, for many applications and especially in the coating arts, heat for curing purposes is no longer satisfactory because (1) it is still slow; (2) it cannot be used with heat sensitive substrates; and (3) it often requires use of a volatile solvent which can be a potential air pollutant and costly to recycle.

To enhance the rate of polymerization of ethylenically unsaturated organic compounds by exposure to radiation such as ultraviolet photoinitiators or photosensitizers are included with said organic compounds. For clarity, the term photopolymerizable composition as understood herein refers to that composition which hardens (cures) upon exposure to radiation and which can be a vehicle or a binder for use in surface coatings such as paint, varnish, enamel, lacquer, stain or ink. Typical photosensitizers have been benzenesulfonyl chloride, p-toluenesulfonyl chloride, naphthalenesulfonyl chloride, zinc and cadium sulfides, and sulfinic and phosphinic compounds. These prior art sensitizers however have not been completely satisfactory particularly in photopolymerizable compositions which contain pigments. In this respect, it is believed that most pigments absorb or mask a substantial proportion of the radiation, often rendering the remainder incapable to energize the sensitizer sufficiently to generate the requisite amount of free radicals to initiate the desired rate of polymerization.

Typical sources for ultraviolet radiation include a number of commercial units such as electric arc lamps, plasma arc torch (see U.S. Pat. No. 3,364,387) and even lasers having a lasing output in the ultraviolet spectrum (see copending application of de Souza and Buhoveckey Ser. No. 189,254). The subject matter of the aforementioned patent applications are incorporated herein by reference.

Advantages of the instant invention over the prior proposals include economical and efficient utilization of ultraviolet energy especially in wavelengths between 3,200 and 4,000 A to perform "cold" polymerization (curing) of the binders or vehicles at very short exposure times with attendant suppression of losses due to volatilization of components of paint, suppression of discoloration or degradation of resulting deposits which can be generally considered as films, and avoidance of shrinkage and distortion (preservation of dimentional stability) and suppression of degradation of substrate to which the polymerizable vehicle is applied particularly when such substrate is paper, fabric or plastics.

SUMMARY OF THE INVENTION

In accordance with the present invention, there is provided a process for the photopolymerization of ethylenically unsaturated organic compounds including monomers, oligomers, and polymers, which process comprises subjecting to a source of ultraviolet radiation having wavelengths of about 1,800 to 4,000 A a composition comprising a photopolymerizable binder, and a sensitizer consisting essentially of a thioxanthone and an activated halogenated azine compound. The proportion in the sensitizer is 1 part thioxanthone to 0.66 to 1.5 parts of the azine. The composition can also have a pigment which can be organic or inorganic in nature. Surprisingly, the pigment can be present up to about 50 percent by weight of the entire composition, or in terms of the binder, pigment-to-binder ratios can be up to 1:1.

DETAILED DESCRIPTION OF THE INVENTION

The sensitizer, also referred to as the photoinitiator, composition of the present invention comprises two basic components: (1) a thioxanthone and (2) an activated halogenated azine compound. By thioxanthone I mean the class of aromatic compounds represented by the formula:

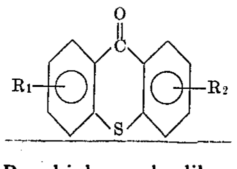

wherein $R_1$ and $R_2$ which can be like or unlike are H, Cl, Br, OH, $NH_2$, or lower alkyls. Representative thioxanthones in addition to thioxanthone itself include 2-Chlorothioxanthone, 2-bromothioxanthone, 6-Chlorothioxanthone, 2,6-dichlorothioxanthone, 6-bromothioxanthone, 2,6-dibromothioxanthone, 2-hydroxythioxanthone, 2-aminothioxanthone, 2-methyl thioxanthone, 2,4-dimethyl thioxanthone, 2-ethyl thioxanthone, 2-chloro-6-methyl thioxanthone, and 2-Chloro-6-ethyl thioxanthone. Thioxanthone is commercially available and so are some of the aforementioned derivatives. Preparative routes involving thiosalicyclic acid and reagents such as benzene, toluene, chlorobenzene, etc., were followed, for convenience, to synthesize few of the derivatives, however.

As to the second basic component, it is an activated halogenated azine wherein the activated halogenated moiety refers to substituents selected from halosulfonyl, α-haloalkyl, and α-haloalkylated aryls. For efficiency and economy the halo group is preferably chloro or bromo.

Representative azine compounds in accordance with the present invention are listed below with the common name provided in parenthesis.

A. 2-halomethyl-1-benzazine (2-halomethyl quinoline)

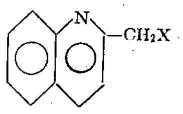

B. 2,4-bis (haloalkyl)-1-benzazine (2,4-bis (haloalkyl) quinoline)

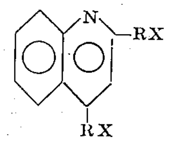

C. 2,6-bis (haloalkyl)-1-benzazine (2,6-bis (haloalkyl) quinoline)

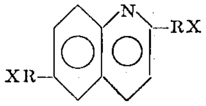

D. 2,7-bis (haloalkyl)-1-benzazine (2,7-bis (haloalkyl)-quinoline)

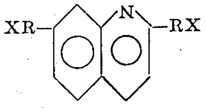

E. 1-haloalkyl-2-benzazine (1-haloalkylisoquinoline)

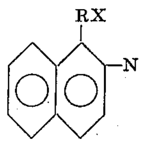

F. 3-haloalkyl-2-benzazine (3-haloalkylisoquinoline)

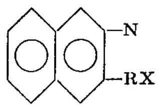

G. 8-Chlorosulfonyl-1-benzazine (8-quinoline sulfonylchloride)

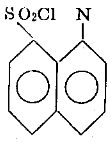

H. 2-haloalkyl-1,4-benzodiazine (2-haloalkylquinoxaline)

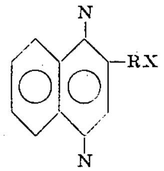

I. 3-haloalkyl-1,4-benzodiazine (3-haloalkylquinoxaline)

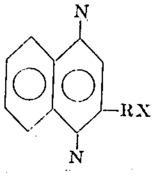

J. 2,3-bis haloalkyl-1,4-benzodiazine (2,3-bishaloalkylquinoxaline)

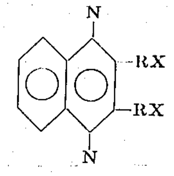

K. 2,5-bis haloalkyl-1,4-diazine (2,5-bishaloalkylpyrazine)

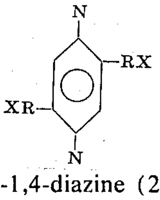

L. 2,6-bis haloalkyl-1,4-diazine (2,6-bishaloalkylpyrazine)

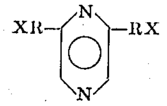

M. 3,5-bis haloalkyl-1,4-diazine (3,5-bishaloalkylpyrazine)

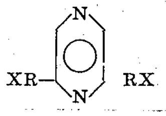

N. 2-Chlorosulfonyl-1,8-benzodiazine (2-Chlorosulfonyl-naphthyridine)

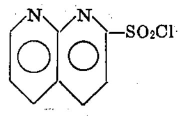

wherein R is a lower alkyl radical, (1–4 carbons) and X is either Cl or Br.

As can be seen from the illustrated structures it is important that the active halogenated group, be it the chlorosulfonyl radical or the haloalkyl radical should be substituted on the carbon located in the alpha position with respect to the azine (nitrogen) group.

The needed proportion of one or both components of the sensitizer composition of the present invention can be incorporated directly into the binder as a unit of a further polymerizable monomer, oligomer, prepolymer, or polymer. In such instance, for example, the sensitizer compound has a reactable functional group on it such as a carboxyl group or a hydroxyl group. Thus each sensitizer compound can be made to react with a further polymerizable material, e.g., glycidyl acrylate, either in monomeric form or already part of a preformed prepolymer or oligomer.

The two basic components are present generally from about 0.5 to 4 percent for the thioxanthone and 0.3 to 6.0 percent of the azine compound, the percentage being based on the total weight of the composition. Preferably, these components are incorporated to the extent of 1–3 percent by weight for the thioxanthone and 0.5–2.5 percent by weight for the azine compound.

Typically, the vehicles can constitute the entire deposit or a binder for solids to yield a cured product in the nature of a paint, varnish, enamel, lacquer, stain or ink. Usually the vehicles are fluid at ordinary operation temperatures (between about 30°F. and about 300°F. and advantageously between ordinary room temperature and about 180°F.), and when polymerized by the U.V. radiation, give a tack-free film or deposit that is durable enough for ordinary handling. In the cured state such vehicle is resinous or polymeric in nature, usually crosslinked. Uncured for application to a substrate or uncured on such substrate, such vehicle consists essentially of a monomer or mixture of monomers, or a further polymerizable oligomer, prepolymer, resin, or mixture of same, or a resinous material dispersed or dissolved in a solvent that is copolymerizable therewith. Such solvent ordinarily is monomeric, but can be an oligomer (i.e., up to 4 monomer units connected) or prepolymer (mol weight rarely above about 2,000). Oligomers and prepolymers should be understood herein as being polymeric in nature.

Suitable ethylenically unsaturated compounds which are photopolymerizable with the aid of the above photoinitiators include the various vehicles or binders which can be reactive vinyl monomers such as the lower alkyl esters of acrylic and methacrylic acids or polymer and prepolymers. Vinyl monomers particularly adapted for photopolymerization include methylmethacrylate, ethylmethacrylate, 2-ethylhexyl methacrylate, butylacrylate, isobutyl methacrylate, the corresponding hydroxy acrylates; e.g., hydroxy ethylacrylate, hydroxy propyl acrylate, hydroxy ethylhexyl acrylate, also the glycol acrylates; e.g., ethylene glycol dimethacrylate, hexamethylene glycol dimethacrylate, the allyl acrylates; e.g., allyl methacrylate, diallyl methacrylate, the epoxy acrylates; e.g., glycidyl methacrylate; and the aminoplast acrylates; e.g., melamine acrylate. Others such as vinyl acetate, vinyl and vinylidene halides and amides, e.g., methacrylamide, acrylamide, diacetone acrylamide, butadiene, styrene, vinyl toluene, and so forth are also included.

It should be noted that the sensitizers of the present invention not only contribute to the rapid curing of the coating surface, but also to the depth of cure which is quite practical that the resultant polymerized deposit resists scratching or disruption when it is first ostensibly "dry" on the surface. Curing can continue on stored pieces. Typical film thickness for the deposit can be about 0.1 to as high as 10 mils. Preferred cured deposits are continuous films, but decorative or message-transmitting ones need not be.

Typically, the substrate workpieces coated with the uncured deposit or deposits are passed under a U.V.-providing light beam by a conveyor moving at predetermined speeds. The substrate being coated can be metal, mineral, glass, wood, paper, plastic, fabric, ceramic, etc.

A distinct advantage of the present invention is that many useful pigments can be incorporated, in modest proportions, into the vehicle without much deleterious effects. Thus, opacifying pigments such as zinc oxide can be used quite well. Titania, e.g., anatase and particularly rutile, can also be used with ease even though customarily it has been much more difficult to cure rutile pigmented films by U.V. radiation. Other filler materials and coloring pigments such as basic lead sulfate, magnesium silicate, silica, clays, wollastonite, talcs, mica, chromates, iron pigments, wood flour, microballons, hard polymer particles, and even reinforcing glass fiber or flake also are suitable in the vehicle to make a paint. Generally, little to no pigments are used in photopolymerizable vehicles because of the attendant difficulty of rapid curing. It is believed that pigment particles tend to absorb the bulk of the useful ultraviolet radiation leaving only a minor portion of said radiation to energize the sensitizers and generate the requisite amount of necessary free radicals. This is particularly true in the case of rutile-type pigments.

The fact that my sensitizer composition functions in the presence of pigments is quite surprising and unexpected. By itself, the azine compound i.e., 8-chlorosulfonyl-1-benzazine, 2,3-bis(bromomethyl)-1,4-benzodiazine. . . etc., is a very good photoinitiator in non-pigmented systems (clears). In the presence of pigments, and especially of the rutile type, the azine compound fails noticeably, giving substantially no photoinitiation activity even with repeated exposures to the ultraviolet source. As to the thioxanthone it provides little to no photoinitiation for both pigmented or clear systems.

As stated earlier, the reason the azine compound fails as a photoinitiator in pigmented systems (pigment-to-binder ratio being 1:10 to 1:1) is largely due to the pigment's masking effect. It is believed that in order for the azine compound to function as a photoinitiator it should be subjected to (so it can absorb) ultraviolet radiation having wavelengths between 2,000 and 3,300 A. Generally, most pigments tend to absorb the substantial portion of the U.V. spectrum, i.e., 2,000 to 4,000 A, leaving little, if any, for energizing the azine compound.

The problem of the pigment's masking effect has been overcome successfully by my present sensitizer composition. Without being bound by theory, the mechanism by which my sensitizer composition functions either is based on the difference in triplet energy between the thioxanthone and the azine compound, or is influenced by the charge transfer taking place between them, or both.

The following examples show ways in which this invention has been practiced, but should not be construed as limiting it. Unless otherwise specifically stated herein, all parts are parts by weight, all percentages are weight percentages and all temperatures are in degrees Fahrenheit. Where the binder being cured is of the type normally curable by free-radical polymerization, it is sometimes advantageous for completeness of cure and speed to maintain a substantially inert atmosphere above the irradiated workpiece. Generally this is effected by maintaining a purge of nitrogen or other inert gas or placing a thin film of completely transparent polyethylene over the workpiece.

EXAMPLE 1

A number of acrylic resins and combinations thereof were utilized in evaluating the photoinitiator of the present invention. For convenience, the polymerizable binder composition comprised three acrylic resins in equal proportions. These resins were acrylic monomers, diacrylate and triacrylate oligomers.

A polymerizable composition consisting of ⅓ 2-ethylhexyl acrylate, ⅓ ethylene glycol diacrylate, and ⅓ trimethylolpropane triacrylate was prepared with various photoinitiators in accordance with the present invention. To each composition was added conventional pigment and at various pigment-to-binder ratios ranging from 0.2 to 0.9 parts pigment per 1 part binder. The pigment was dispersed within the binder in a conventional manner.

Each sensitized binder composition was poured over a pair of steel panels and drawn down with a No. 8 wound wire rod to a film thickness or coating of approximately 0.5 mil. The coated but wet panels were each exposed to a different source of ultraviolet light; one provided from a plasma arc radiation source (PARS) and the other a conventional ultraviolet light supplied by Ash Dee Corporation, said light having two 4,000 watt mercury lamps. Exposure times were from 0.07 sec. to 30 secs., with the panels being placed approximately 5 inches from the ultraviolet source. These exposure times are calculated from the speed of the conveyor belt on which the panels are placed. For example, a speed rate of 300 feet per minute corresponds to 0.07 second exposure time, whereas the speed of approximately 86 to 100 feet per minute corresponds to 0.2 seconds. The photopolymerization was done in an inert atmosphere (blanket of nitrogen gas).

In Table I there are shown the results of exposing panels coated with various combinations of pigment-to-binder ratios and which also included photoinitiators of the present invention. Under the column designated "cure," the nature of the finished or cured films is described. For example, tacky indicates that the film is still soft to the touch; i.e., incomplete polymerization. The term, hard, on the other hand indicates full cure.

TABLE I

| PHOTOINITIATOR % wt. | PIGMENT & PIGMENT-TO-BINDER RATIO | U.V. SOURCE | TIME Sec. | CURE |
|---|---|---|---|---|
| 2,3-Bis(bromo-methyl)-1,4-benzodiazine, 2% | Rutile $TiO_2$ (0.5) | PARS | 0.2 | Tacky and Wet |
| 2,3-Bis(bromo-methyl)-1,4-benzodiazine, 4% | Rutile $TiO_2$ (0.5) | PARS | 0.2 | Tacky and Wet |
| 2,3-Bis(bromo-methyl)-1,4-benzodiazine, 2% | Rutile $TiO_2$ (0.5) | Conventional | 7 | Tacky and Wet |
| 10-Thioxanthone, 2% | Rutile $TiO_2$ (0.5) | PARS | 0.2 | Wet |
| 2-Acetophenone sulfonyl chloride, 2% | Rutile $TiO_2$ (0.5) | PARS | 0.2 | Wet |
| 10-Thioxanthone, 2% | Rutile $TiO_2$ (0.5) | Conventional | 7 | Wet |
| 2,3-Bis(bromo-methyl)-1,4-benzodiazine, 2% 10-thioxanthone, 1% | Rutile $TiO_2$ (0.5) | PARS | 0.2 | Hard |
| 8-Chlorosulfonyl-1-benzazine, 2% 10-thioxanthone, 1% | Rutile $TiO_2$ (0.5) | PARS | 0.2 | Hard |
| 8-Chlorosulfonyl-1-benzazine, 2% 10-thioxanthone, 1% | Rutile $TiO_2$ (0.7) | PARS | 0.2 | Hard |
| 2,3-Bis(bromo-methyl)-1,4-benzodiazine, 2% 10-thioxanthone, 1% | Rutile $TiO_2$ (0.9) | PARS | 0.2 | Hard |
| 2-Bromomethyl-1,4-benzodiazine, 2% 10-thioxanthone, 1% | Anatase $TiO_2$ (0.8) | PARS | 0.2 | Hard |
| 3-Bromomethyl-2-benzazine, 2% 10-thioxanthone, 1% | Anatase $TiO_2$ (0.5) | PARS | 0.2 | Hard |
| 2,4-bis(Chloro-methyl)-1-benzazine, 2% 2-Chlorothioxanthone | Anatase $TiO_2$ (0.5) | PARS | 0.2 | Hard |
| 2,3-Bis(bromo-methyl)-1,4-benzodiazine, 2% 6-Chlorothioxanthone, 1% | Rutile $TiO_2$ (0.8) | PARS | 0.2 | Hard |
| 2,3-Bis(bromo-methyl)-1,4-benzodiazine, 2% 6-Chlorothioxanthone, 1% | ZnO (1.0) | PARS | 0.2 | Hard |
| 2,6-Bis(bromo-methyl)-1,4-diazine, 3% 2-Chlorothioxanthone. | Rutile $TiO_2$ (0.5) | PARS | 0.2 | Hard |

EXAMPLE 2

A "clear" vehicle was prepared first from ⅓ part pentaerythritol triacrylate, ⅓ part hydroxyethyl acrylate, and ⅓ the adduct formed by reacting one mol of toluenediisocyanate with 2 mols of hydroxyethyl acrylate. Anatase $TiO_2$ was incorporated into said clear vehicle to provide a pigment-to-vehicle (binder) ratio of 0.6.

The curing procedure was carried out in the same manner described in Example 1. Without the incorporation of any sensitizers no curing (hardening) of the coated film (0.5 mil) was observed even with repeated exposures to the U.V. source. (Panels coated with the pigmented vehicle to about 0.5 mil thickness are passed under the PARS U.V. radiation source at line speeds of 100 feet per minute for 100 consecutive times without any observable curing). 8-Quinoline sulfonyl chloride to the extent of 2 percent by weight of said vehicle, and 10-thioxanthone to the extent of 1.0 percent by weight were incorporated into the above-described pigmented vehicle and dispersed well thereinto. The sensitized pigmented composition was irradiated by the PARS ultraviolet source described in Example 1 at line speeds of 100 feet per minute showing full cure. With conventional ultraviolet the time was 7 seconds.

Other pigments were incorporated into the vehicle such as zinc oxide, iron black, copper phthalocyanine blues and greens all resulting in the same hard cure after comparable exposure times.

EXAMPLE 3

A "clear" vehicle was prepared from ½ trimethylolpropane and ½ 2-ethylhexylacrylate. Into said vehicle was incorporated separately (with pigment-to-vehicle ratio of 0.5) a series of pigments, i.e., rutile $TiO_2$, anatase $TiO_2$, iron black, antimony oxide, lead basic sulfate, copper phthalocyanine greens. Into said sample was incorporated 2 percent by weight of 8-Quinoline sulfonyl chloride and 1.0 percent by weight of 2-bromomethylquinoline. The samples were reduced to films (0.4 mil) on aluminum panels and irradiated with PARS U.V. source at a line speed of 100 ft/min. (0.2 sec.). No satisfactory cure was shown even after repeated exposures. When one of the azine compounds was replaced with thioxanthone full cure was obtained. This was true of all the pigmented vehicles described.

EXAMPLE 4

A "clear" vehicle was prepared from ⅓ ethylhexyl acrylate, ⅓ trimethylolpropane triacrylate and ⅓ DER 332 diacrylate (a trademark of DOW Chemical Co.). Rutile $TiO_2$ was added to the vehicle until P/B (pigment-to-binder) ratio of 0.8/1 was attained.

Table II lists the various sensitizer systems incorporated into the above-described vehicle and the curing times corresponding to the particular source of ultraviolet radiation, be it PARS or Conventional. Again times were calculated from line speeds carrying the panels coated with the sensitized vehicles.

TABLE II

| NO | PHOTOSENSITIZER COMPOSITIONS A, %wt. | B, %wt. | U.V. SOURCE | TIME SEC | CURE |
|---|---|---|---|---|---|
| 1. | 2,3-Bis(bromomethyl)-1,4-benzodiazine, 2% | 10-thioxanthone, 1.0 | PARS<br>Conventional | 0.2<br>7.0 | Hard<br>Hard |
| 2. | 2,4-Bis(Chloromethyl)-1-benzazine, 2% | 10-thioxanthone, 1.0 | PARS<br>Conventional | 0.2<br>7.0 | Hard<br>Hard |
| 3. | 8-Chlorosulfonyl-1-benzazine, 2% | — | PARS<br>Conventional | 2.0<br>7.0 | Wet<br>Wet |
| 4. | 8-Chlorosulfonyl-1-benzazine, 2% | 2-chlorothioxanthone, 1.0 | PARS<br>Conventional | 0.2<br>7.0 | Hard<br>Hard |
| 5. | 8-Chlorosulfonyl-1-benzazine, 2% | 6-chlorothioxanthone, 1.0 | PARS<br>Conventional | 0.2<br>7.0 | Hard<br>Hard |
| 6. | 8-Chlorosulfonyl-1-benzazine, 2% | anthraquinone, PARS<br>1.0 | 0.2<br>Conventional | Tacky<br>7.0 | <br>Tacky |
| 7. | Benzophenone, 2.0 | anthraquinone, 1.0 | PARS<br>Conventional | 0.2<br>7.0 | Wet<br>Wet |

EXAMPLE 5

To the clear vehicle of Example 4 was added separately the following pigments: $TiO_2$ (anatase), copper phthalocyanine blues and greens, zinc oxide, and iron oxide. Now into each pigmented vehicle (P/B = 0.8/1) was incorporated 2.0 percent by weight of 8-Quinoline sulfonyl chloride and 1.0 percent of 2-chloro, 6-methylthioxanthone. After exposure to both PARS and Conventional U.V. radiation the pigmented vehicles showed full cure after 0.2 sec. and 7.0 sec., respectively.

EXAMPLE 6

Repeating the same procedure of Example 5, except 1.5 percent of the azine compound and 1.5 percent of the thioxanthone compound were incorporated. The results showed no detectable change.

EXAMPLE 7

Repeating the same procedure of Example 5 except the azine compound was changed to 3,5-Bis-(bromomethyl)pyrazine 2.0 percent. The same excellent results were obtained.

EXAMPLE 8

Repeating the same procedure of Example 5 except the azine compound was 2,7-bis(Chlorosulfonyl)-1-benzazine. Again the same excellent results were obtained.

EXAMPLE 9

Repeating the procedure of Example 5 except the azine compound was 2-Chlorosulfonyl-1,8-benzodiazine. The results were excellent in that curing time of about 0.07 seconds under PARS was obtainable. This is a decided advantage.

What is claimed is:

1. A process for polymerizing an ethylenically unsaturated polymerizable vehicle in which a pigment is dispersed in a pigment-to-vehicle ratio of 1:10 to 1:1 to form a pigmented composition by exposure to ultraviolet radiation, which comprises incorporating into said vehicle an ultraviolet sensitizer proportion consisting essentially of (a) a thioxanthone compound as represented by the formula:

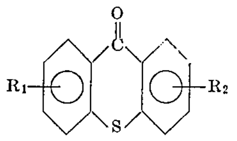

wherein $R_1$ and $R_2$ which can be like or unlike, are H, Cl, Br, OH, $NH_2$ or lower alkyls, and (b) an azine compound selected from the group consisting of benzazines, benzodiazines, and diazines, said azine compound characterized by having a substituted activated halogenated moiety selected from halosulfonyl, α-haloalkyl, and α-haloalkylated aryl; said thioxanthone compound being present from about 0.5 to 4.0 percent by weight, and said azine compound being present from about 0.3 to 6.0 percent by weight, based on the weight of the composition.

2. The process of claim 1 wherein said thioxanthone is selected from the group consisting of halo-substituted thioxanthone, alkyl-substituted thioxanthone, amino-substituted thioxanthone, hydroxy-substituted thioxanthone, and mixtures thereof.

3. The process of claim 2 wherein said halo-substituted thioxanthone is selected from the group consisting of 2-chlorothioxanthone, 2-bromothioxanthone, 2,6-dichlorothioxanthone, and 2,6-dibromothioxanthone.

4. The process of claim 2 wherein said alkyl-substituted thioxanthone is selected from the group consisting of 2-methylthioxanthone, 2,4-dimethylthioxanthone, and 2-ethylthioxanthone.

5. The process of claim 1 wherein said activated halogenated benzazine is selected from the group consisting of α-chloroalkylated benzazines, α-bromoalkylated benzazines, and chlorosulfonated benzazines.

6. The process of claim 1 wherein said activated halogenated benzodiazine is selected from the group consisting of α-chloroalkylated benzodiazines, α-bromoalkylated benzodiazines and chlorosulfonated benzodiazines.

* * * * *